United States Patent
Combs

(10) Patent No.: US 10,857,402 B2
(45) Date of Patent: Dec. 8, 2020

(54) FIREFIGHTING MONITOR

(71) Applicant: Elkhart Brass Manufacturing Company, Inc., Elkhart, IN (US)

(72) Inventor: Eric N. Combs, Goshen, IN (US)

(73) Assignee: Elkhart Brass Manufacturing Company, Inc., Elkhart, IN (US)

(*) Notice: Subject to any disclaimer, the term of this patent is extended or adjusted under 35 U.S.C. 154(b) by 113 days.

(21) Appl. No.: 15/383,669

(22) Filed: Dec. 19, 2016

(65) Prior Publication Data

US 2017/0095682 A1    Apr. 6, 2017

Related U.S. Application Data

(63) Continuation of application No. 13/011,459, filed on Jan. 21, 2011, now Pat. No. 9,557,199.

(60) Provisional application No. 61/297,013, filed on Jan. 21, 2010.

(51) Int. Cl.
| | |
|---|---|
| *A62C 27/00* | (2006.01) |
| *A62C 31/24* | (2006.01) |
| *G01F 1/34* | (2006.01) |
| *A62C 37/50* | (2006.01) |

(52) U.S. Cl.
CPC ............. *A62C 27/00* (2013.01); *A62C 31/24* (2013.01); *A62C 37/50* (2013.01); *G01F 1/34* (2013.01); *Y10T 137/0379* (2015.04)

(58) Field of Classification Search
CPC ......... A62C 27/00; A62C 37/50; A62C 31/24; G01F 1/34
USPC ......... 169/24, 51, 52, 56; 239/166, 172, 146
See application file for complete search history.

(56) References Cited

U.S. PATENT DOCUMENTS

| | | |
|---|---|---|
| 3,786,869 A | 1/1974 | McLoughlin |
| 3,943,312 A | 3/1976 | Bernstein et al. |
| 3,974,879 A | 8/1976 | Nelson, Jr. et al. |
| 3,981,618 A | 9/1976 | Nelson, Jr. |
| 4,189,005 A | 2/1980 | McLoughlin |
| 4,593,855 A | 6/1986 | Forsyth |

(Continued)

FOREIGN PATENT DOCUMENTS

| | | |
|---|---|---|
| JP | 04138176 A | 5/1992 |
| WO | WO2003/055714 A1 | 7/2003 |

(Continued)

OTHER PUBLICATIONS

Webpage: STNews.com, New Monitor Position Indicator Safely Aims Water Stream at Fire, accessed Mar. 16, 2012.

(Continued)

*Primary Examiner* — Qingzhang Zhou
(74) *Attorney, Agent, or Firm* — Taft Stettinius & Hollister LLP

(57) ABSTRACT

A firefighting monitor includes logic circuitry for determining the reaction force caused by the flow of firefighting fluid therethrough. The reaction force may be communicated to structures remote from the monitor for taking appropriate actions in response to the reaction forces exceeding one or more criteria. The monitor may also use flow and nozzle data for calculating a reach of the stream of the fluid, and may transmit this reach data to a remote location. The monitor may also utilize multiple pressure sensor transducers positioned inside the monitor for determining the rate of fluid flow, rather than a paddle wheel-type sensor.

18 Claims, 6 Drawing Sheets

(56) References Cited

U.S. PATENT DOCUMENTS

| | | | |
|---|---|---|---|
| 4,805,862 A | 2/1989 | Wissman | |
| 4,949,794 A | 8/1990 | Petit et al. | |
| 5,044,445 A | 9/1991 | Kayahara | |
| 5,223,822 A | 6/1993 | Stommes et al. | |
| 5,301,756 A | 4/1994 | Relyea et al. | |
| 5,411,100 A | 5/1995 | Laskaris et al. | |
| 5,579,800 A | 12/1996 | Walker | |
| 5,727,933 A | 3/1998 | Laskaris et al. | |
| 5,899,276 A | 5/1999 | Relyea et al. | |
| 5,908,990 A | 6/1999 | Cummings | |
| 5,979,564 A | 11/1999 | Crabtree | |
| 6,343,615 B1 | 2/2002 | Miller et al. | |
| 6,402,048 B1 | 6/2002 | Collins | |
| 6,421,593 B1 | 7/2002 | Kempen et al. | |
| 6,547,528 B1 | 4/2003 | Yoshida | |
| 6,553,290 B1 | 4/2003 | Pillar | |
| 6,651,900 B1 | 11/2003 | Yoshida | |
| 6,725,940 B1 | 4/2004 | Klein | |
| 6,757,597 B2 | 6/2004 | Yakes et al. | |
| 6,766,863 B2 | 7/2004 | Arvidson et al. | |
| 6,772,845 B1 | 8/2004 | Janson | |
| 6,882,917 B2 | 4/2005 | Pillar et al. | |
| 6,885,920 B2 | 4/2005 | Yakes et al. | |
| 6,886,639 B2 | 5/2005 | Arvidson et al. | |
| 6,909,944 B2 | 6/2005 | Pillar et al. | |
| 6,922,615 B2 | 7/2005 | Pillar et al. | |
| 6,991,041 B2 | 1/2006 | Laskaris et al. | |
| 6,993,421 B2 | 1/2006 | Pillar et al. | |
| 6,994,282 B2 | 2/2006 | Trapp et al. | |
| 7,006,902 B2 | 2/2006 | Arder et al. | |
| 7,024,296 B2 | 4/2006 | Squires | |
| 7,051,952 B2 * | 5/2006 | Drechsel | A01G 25/09 239/230 |
| 7,072,745 B2 | 7/2006 | Pillar et al. | |
| 7,107,129 B2 | 7/2006 | Rowe et al. | |
| 7,097,113 B2 | 8/2006 | Ivans | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,191,964 B2 | 3/2007 | Trapp | |
| 7,234,534 B2 | 6/2007 | Froland et al. | |
| 7,243,864 B2 | 7/2007 | Trapp et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,318,483 B2 | 1/2008 | Arvidson et al. | |
| 7,379,797 B2 | 5/2008 | Nasr et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,451,028 B2 | 11/2008 | Pillar et al. | |
| 7,522,979 B2 | 4/2009 | Pillar | |
| 7,555,369 B2 | 6/2009 | Pillar | |
| 7,571,662 B2 | 8/2009 | Pickering et al. | |
| 7,614,455 B2 | 11/2009 | Arvidson et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar | |
| 7,739,921 B1 | 6/2010 | Babcock | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,831,363 B2 | 11/2010 | Quigley | |
| 7,835,838 B2 | 11/2010 | Pillar et al. | |
| 7,848,857 B2 | 12/2010 | Nasr et al. | |
| 7,874,373 B2 | 1/2011 | Morrow et al. | |
| 7,878,703 B2 | 2/2011 | Roberts | |
| 7,889,187 B2 | 2/2011 | Freier et al. | |
| 7,954,508 B2 | 6/2011 | Doyle et al. | |
| 7,987,916 B2 | 8/2011 | Laskaris et al. | |
| 7,997,348 B2 | 8/2011 | Hosfield | |
| 8,000,850 B2 | 8/2011 | Nasr et al. | |
| 8,095,247 B2 | 1/2012 | Pillar et al. | |
| 8,162,619 B2 | 4/2012 | Laskaris | |
| 8,245,790 B2 | 8/2012 | Lozier | |
| 2001/0013555 A1 | 5/2001 | Egashira et al. | |
| 2003/0130765 A1 | 7/2003 | Pillar et al. | |
| 2003/0158635 A1 | 8/2003 | Pillar et al. | |
| 2003/0189166 A1 | 10/2003 | Black et al. | |
| 2003/0195680 A1 | 10/2003 | Pillar | |
| 2004/0065450 A1 | 4/2004 | Yoshida | |
| 2004/0133319 A1 | 7/2004 | Pillar et al. | |
| 2004/0172800 A1 * | 9/2004 | Seith | B25B 21/00 29/407.01 |
| 2005/0077057 A1 | 4/2005 | Laskaris | |
| 2005/0113996 A1 | 5/2005 | Pillar et al. | |
| 2005/0222287 A1 | 10/2005 | Roberts | |
| 2006/0131038 A1 * | 6/2006 | Lichtig | A62C 37/50 169/52 |
| 2006/0180321 A1 | 8/2006 | Yoshida | |
| 2006/0243324 A1 | 11/2006 | Klein et al. | |
| 2006/0277000 A1 | 12/2006 | Wehrs | |
| 2007/0061054 A1 | 3/2007 | Rowe et al. | |
| 2007/0164127 A1 | 7/2007 | Lozier et al. | |
| 2007/0261509 A1 | 11/2007 | Meyer et al. | |
| 2008/0006094 A1 * | 1/2008 | Schulte | G01F 1/34 73/736 |
| 2008/0035201 A1 | 2/2008 | Roberts | |
| 2008/0041599 A1 | 2/2008 | Mulkey et al. | |
| 2008/0059030 A1 | 3/2008 | Quigley et al. | |
| 2008/0061172 A1 | 3/2008 | Trapp | |
| 2008/0103651 A1 | 5/2008 | Pillar et al. | |
| 2008/0215190 A1 | 9/2008 | Pillar et al. | |
| 2008/0215700 A1 | 9/2008 | Pillar et al. | |
| 2008/0221741 A1 | 9/2008 | Pillar et al. | |
| 2008/0292472 A1 | 11/2008 | Laskaris | |
| 2009/0101368 A1 * | 4/2009 | Lozier | B05B 15/652 169/56 |
| 2009/0218110 A1 | 9/2009 | Laskaris et al. | |
| 2009/0260836 A1 | 10/2009 | Laskaris et al. | |
| 2009/0277656 A1 | 11/2009 | Combs | |
| 2010/0012332 A1 | 1/2010 | Fisher et al. | |
| 2010/0012333 A1 | 1/2010 | Fisher et al. | |
| 2010/0065286 A1 | 3/2010 | Hosfield | |
| 2010/0106433 A1 | 4/2010 | Kleven | |
| 2010/0274397 A1 | 10/2010 | Lozier et al. | |
| 2010/0301668 A1 | 12/2010 | Yakes et al. | |
| 2010/0319479 A1 | 12/2010 | Sjolin et al. | |
| 2011/0064591 A1 | 3/2011 | McLoughlin et al. | |
| 2011/0127051 A1 | 6/2011 | Guse | |
| 2011/0162742 A1 | 7/2011 | Ulens | |
| 2011/0174383 A1 | 7/2011 | Combs | |
| 2011/0200461 A1 | 8/2011 | Christensen et al. | |
| 2011/0240317 A1 | 10/2011 | Laskaris et al. | |
| 2012/0012344 A1 | 1/2012 | McLoughlin et al. | |
| 2012/0061108 A1 | 3/2012 | Cerrano | |
| 2012/0305273 A1 | 12/2012 | Lozier | |

FOREIGN PATENT DOCUMENTS

| | | |
|---|---|---|
| WO | WO2003/059455 A2 | 7/2003 |
| WO | WO2003/060831 A2 | 7/2003 |
| WO | WO2003/061235 A2 | 7/2003 |
| WO | WO2004/052756 A1 | 6/2004 |
| WO | WO2004/102105 A1 | 11/2004 |
| WO | WO2005/011943 A2 | 2/2005 |
| WO | WO2005/021099 A2 | 3/2005 |
| WO | WO2005/039936 A2 | 5/2005 |
| WO | WO2005/100463 A2 | 10/2005 |
| WO | WO2006/037100 A1 | 4/2006 |
| WO | WO2006/052792 A2 | 5/2006 |
| WO | WO2006/118777 A2 | 11/2006 |
| WO | WO2007/140179 A2 | 12/2007 |
| WO | WO2008/002963 A2 | 1/2008 |
| WO | WO2008/021918 A2 | 2/2008 |
| WO | WO2009/002799 A2 | 12/2008 |

(56) References Cited

FOREIGN PATENT DOCUMENTS

| WO | WO2009/108395 A1 | 9/2009 |
| WO | WO2010/148162 A2 | 12/2010 |
| WO | WO2012/033920 A1 | 3/2012 |

OTHER PUBLICATIONS

News Release, United States: Fire Department Gets New Truck, KCHW Newswire, Aug. 21, 2010, Euclid Infotech Private Ltd.
Webpage: KZ Valve.com, Motorized Valves and Controls, accessed Mar. 26, 2012.
Akron Brass—Full Line Catalog, Weldon—Akron Brass, undated.
Hale Products, Class 1 Pump Modules, 2010 Hale Products.
Hale Safe Buy Brochure, Hale Products, undated.
Webpage: Fire Apparatus, Monitors Becoming More Efficient, Easier to Control, Fire Apparatus Magazine, accessed Apr. 9, 2012.
Webpage: HALE, www.haleproducts.com, accessed Mar. 26, 2012.

\* cited by examiner

FIREFIGHTING MONITOR

CROSS-REFERENCE TO RELATED APPLICATIONS

This application is a continuation application of U.S. patent application Ser. No. 13/011,459 filed on Jan. 21, 2011, entitled FIREFIGHTING MONITOR, which claims the benefit under Title 35, U.S.C. Section 119(e) of U.S. Provisional Patent Application Ser. No. 61/297,013, filed Jan. 21, 2010 and entitled FIREFIGHTING MONITOR, the entire disclosures of which are hereby expressly incorporated herein by reference.

BACKGROUND OF THE INVENTION

The present invention relates generally to firefighting equipment, and more particularly to firefighting monitors that include improved sensor and control features.

Conventional firefighting monitors are used in a variety of different applications and environments to deliver firefighting fluid to a fire. In some applications, the firefighting monitors may be mounted to different locations on a fire truck, or to other mobile vehicles, such as boats. In other applications, the monitors may be mounted to stationary structures. In still other applications, the monitor may not be mounted to anything at all, but may be portably laid on the ground at a desired location. Regardless of the particular environment of the monitor, conventional monitors typically include one or more rotatable sections that allow the stream of firefighting fluid to be redirected to different locations through the movement of the one or more rotatable sections. In some monitors, the rotatable sections may be controlled electronically from a remote location, allowing a firefighter to reposition the stream of firefighting fluid from a location removed from the monitor. Conventional monitors may also include a paddle wheel sensor adapted to detect a flow rate of the firefighting fluid flowing through the monitor.

SUMMARY OF THE INVENTION

The present invention relates to firefighting monitors that include improved sensor and control features, as well as methods for using the firefighting monitors. In one embodiment, the improved sensors allow more accurate determinations of flow rate to be made. In other embodiments, the reaction force generated by the flow of the firefighting fluid is determined and utilized in controlling one or more aspects of the monitor. In still other embodiments, the reach of the stream of firefighting fluid is determined with improved accuracy, thereby enabling more effective extinguishing of a fire. Other features and benefits are also provided by the various embodiments.

According to one aspect of the invention, a firefighting monitor is provided that includes a body, a rotation sensor, a flow rate detector, and a controller. The body includes an inlet for receiving firefighting fluid and an outlet for discharging the firefighting fluid. The body includes a tubular section that is rotatable about at least one axis. The rotation sensor measures the amount of rotation of the tubular section about the axis. The flow rate detector determines a rate of fluid flow through the monitor from the inlet to the outlet. The controller is in communication with the rotation sensor and the flow rate sensor and determines an amount of force exerted by the firefighting fluid onto the body in at least one direction based upon information received from the rotation sensor and the flow rate detector.

According to another embodiment, a firefighting monitor is provided that includes a base, first and second sections, first and second pressure sensors, and a controller. The base includes an inlet for receiving firefighting fluid. The first section is rotatably coupled to the base and rotatable about a first axis. The second section is rotatably coupled to the first section and rotatable about a second axis different from the first axis. The second section selectively couples to a nozzle through which the firefighting fluid may be discharged. The first pressure sensor detects a pressure of the firefighting fluid within the monitor at a first location. The second pressure sensor detects a pressure of the firefighting fluid within the monitor at a second location different from the first location. The controller communicates with the first and second pressure sensors and determines a flow rate of the firefighting fluid flowing through the monitor based upon a difference between the pressures detected by the first and second pressure sensors.

According to another aspect, a method of controlling a firefighting monitor is provided. The method includes providing a monitor coupled to a structure, determining a flow rate of fluid through the monitor and an amount of force exerted by the fluid in at least one direction, and determining if the amount of force meets a criterion. If the force meets the criterion, the method further includes doing at least one of the following: rotating at least one of the sections of the monitor until the amount of force no longer meets the criterion; reducing the flow of firefighting fluid through the monitor until the amount of force no longer meets the criterion; moving the structure until the amount of force no longer meets the criterion; and providing a warning to a user of the firefighting monitor that the criterion has been met.

According to still other aspects, the monitor may include a transmitter that transmits to a remote receiver, either wirelessly or via wires, the amount of force exerted by the firefighting fluid. The controller may determine the amount of force in multiple directions, including two or three directions, which may or may not be mutually perpendicular. The controller may be housed within an enclosure physically coupled to the monitor, or it may be housed within an enclosure positioned remotely from the monitor, or it may be divided to include some control components local to the monitor and other control components remote from the monitor. The controller may be further adapted to move a mobile boom to which it is attached based upon the determined amount of force, or it may adjust either an orientation of the monitor or a flow rate of fluid based upon the amount of force. The controller may also use information pertaining to a nozzle orifice size and a nozzle position to determine a reach of the firefighting fluid when exiting from the nozzle of the monitor. The controller may further factor in wind speed and wind direction when determining the reach of the fluid.

DETAILED DESCRIPTION OF THE EMBODIMENTS

Figure 1:
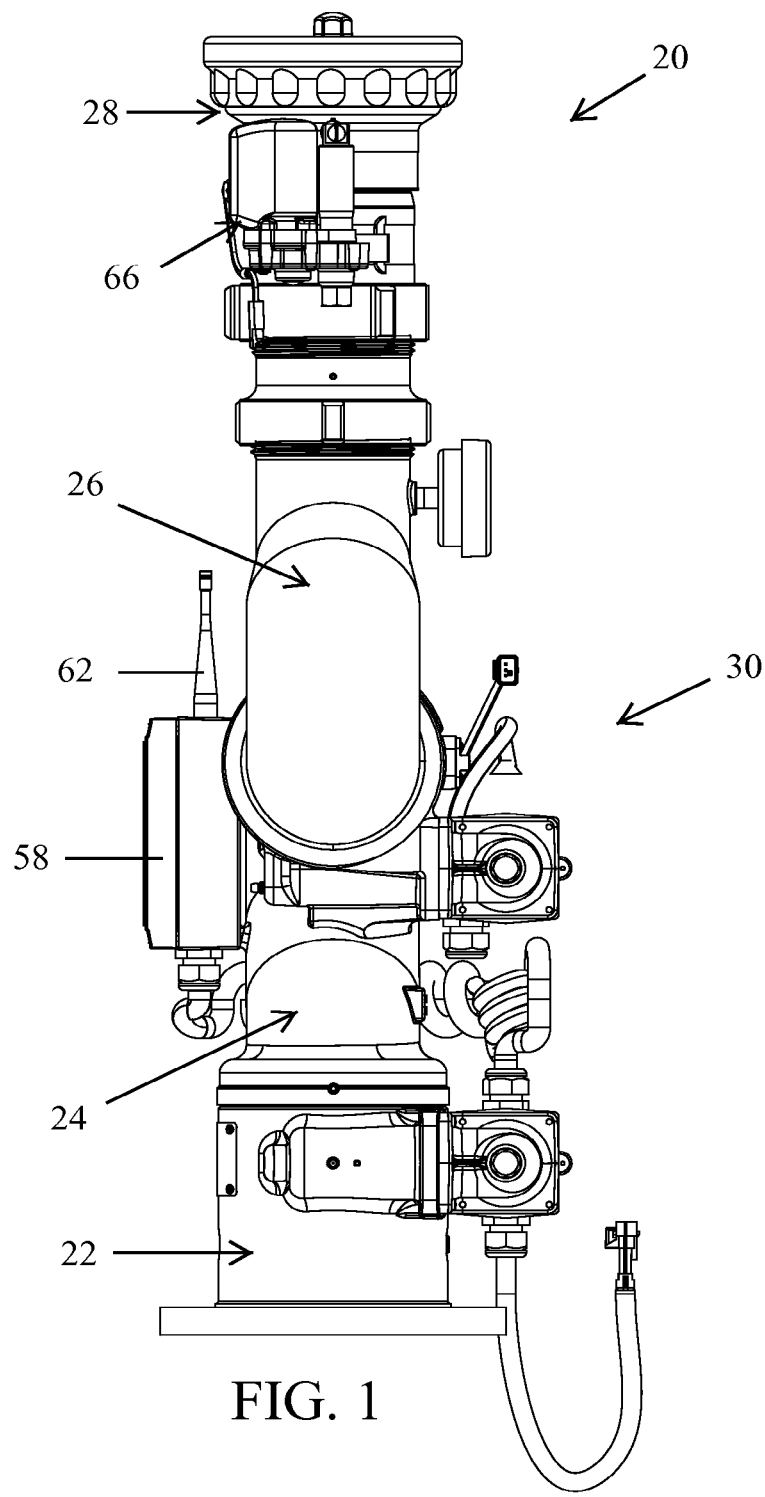
FIG. 1 is a front, elevational view of an illustrative monitor according to one embodiment.
Figure 2:
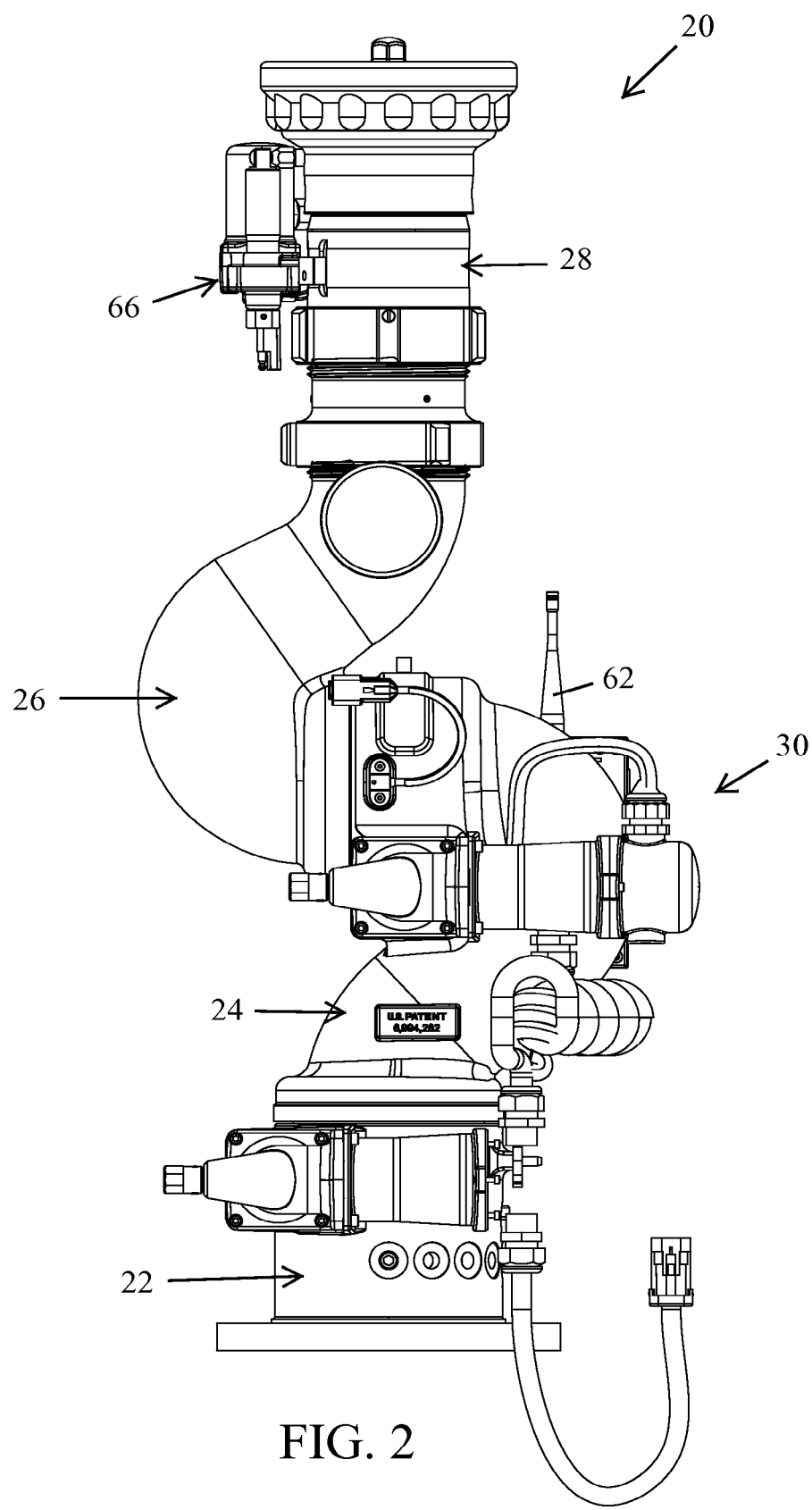
FIG. 2 is a side, elevational view of the monitor of FIG. 1.
Figure 3:
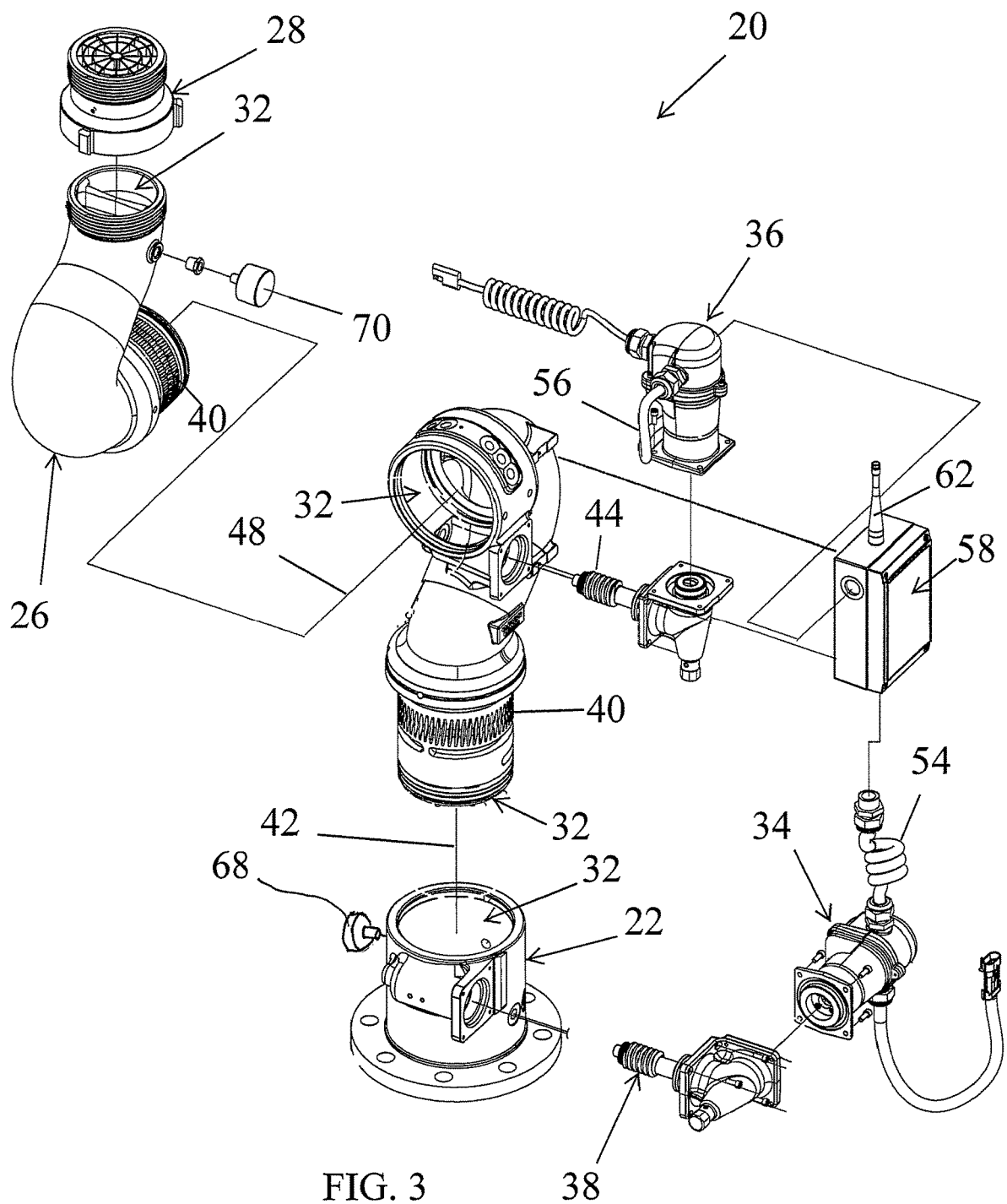
FIG. 3 is a partial, exploded, perspective view of the monitor of FIG. 1.

A firefighting monitor 20 according to one embodiment is illustrated in FIGS. 1-7. Monitor 20 includes a base 22, an inlet section 24, and an outlet section 26. A nozzle 28 is attached to outlet section 26. In combination, base 22, inlet section 24, and outlet section 26 define a body 30 having an internal fluid passageway 32 (FIG. 3). When monitor 20 is used to combat a fire, firefighting fluid, such as, but not limited to water, enters fluid passageway 32 from inlet section 24 and proceeds into outlet section 26 before being discharged through nozzle 28. As will be discussed in greater detail below, by rotating sections 24 and 26 in the appropriate manner, the angular orientation of the stream of firefighting fluid exiting nozzle 28 can be changed such that the stream may be appropriately aimed at the fire.

In the embodiment shown in FIGS. 1-6, the rotation of inlet and outlet sections 24 and 26 is carried out by a plurality of motors. Specifically, a first motor 34 is coupled to base 22 and a second motor 36 is coupled to inlet section 26. First motor 34 selectively drives a first worm gear assembly 38 that engages a first cylindrical arrangement of gear teeth 40 defined on the perimeter of inlet section 24 (FIG. 3). The driving of first motor 34 thus causes inlet section 24 to rotate about a first axis 42. Second motor 36 selectively drives a second worm gear assembly 44 that engages a second cylindrical arrangement of gear teeth 40 defined on the perimeter of outlet section 26. The driving of second motor 36 therefore causes outlet section 26 to rotate about a second axis 48.

Figure 4:
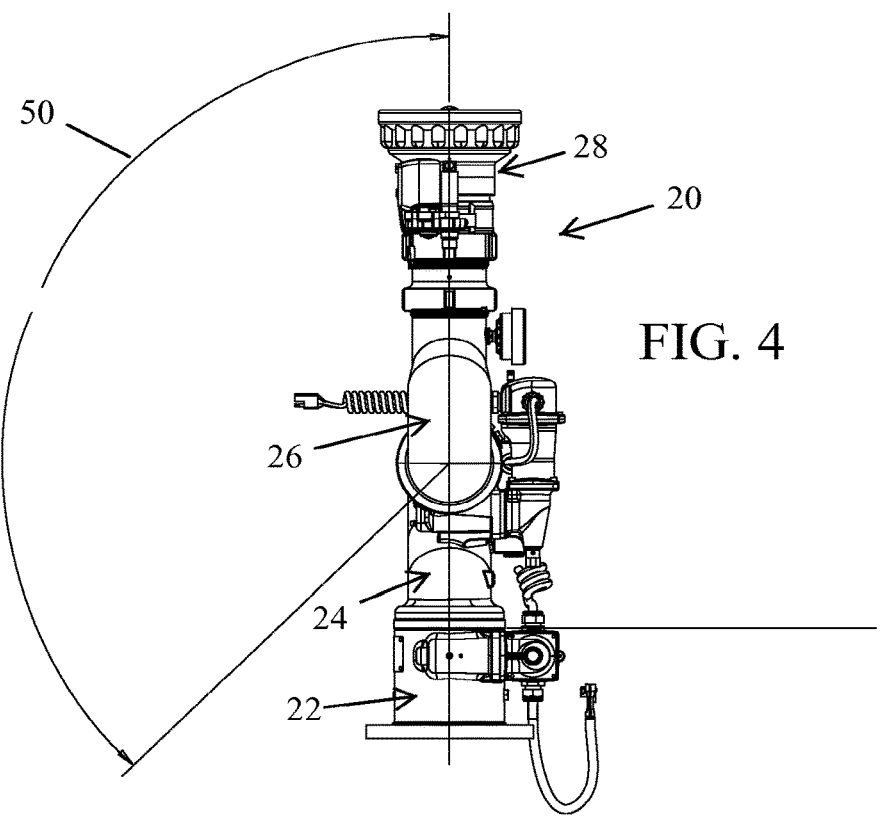
FIG. 4 is a front, elevational view of the monitor illustrating a range of pivoting motion of an outlet section of the monitor.
Figure 5:
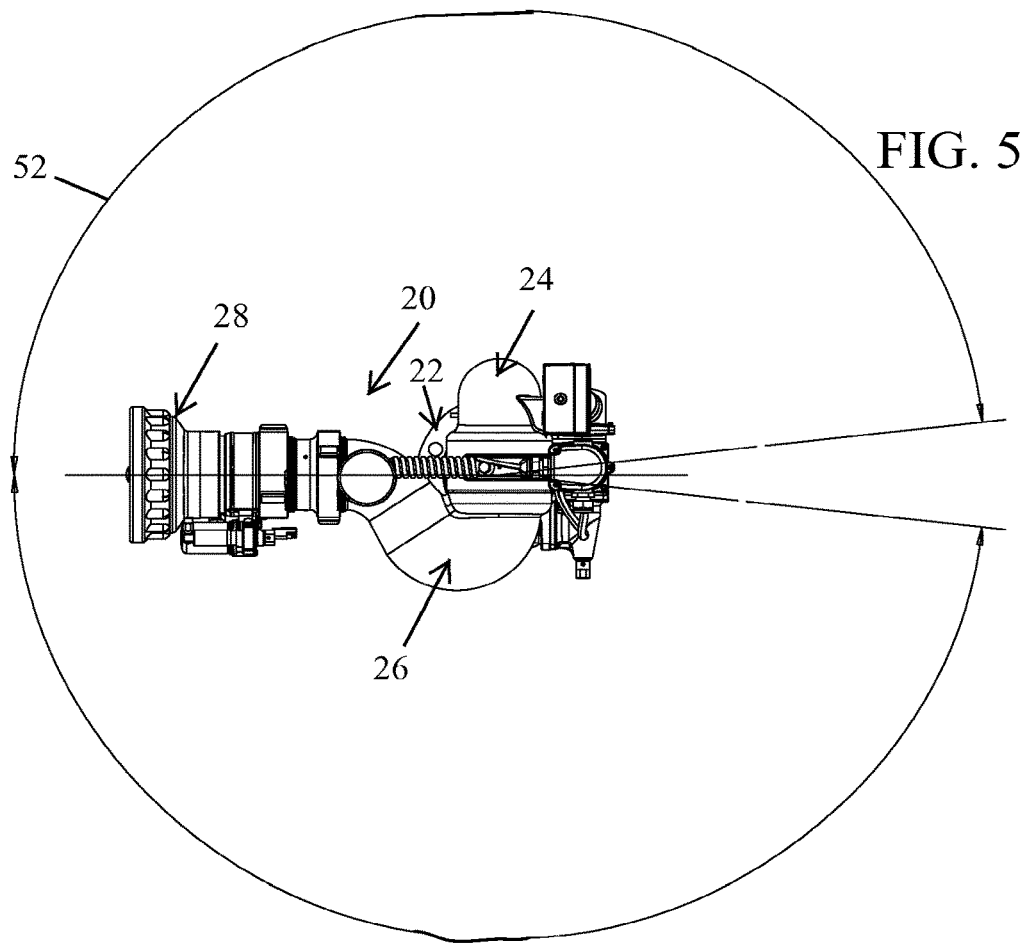
FIG. 5 is a plan view of the monitor illustrating a range of pivoting motion of an inlet section of the monitor.

The pivoting of inlet and outlet sections 24 and 26 about first and second axes 42 and 48 is illustrated in more detail in FIGS. 4 and 5. While FIG. 4 shows outlet section 26 as being pivotable through a range of motion 50 of generally 140 degrees, and FIG. 5 shows inlet section 26 as being pivotable through a range of motion 52 of generally 350 degrees, it will be understood by those skilled in the art that these ranges may be varied. Indeed, in some embodiments, monitor 20 may be constructed such that a full 360 degree range of rotation is available for either or both of inlet and outlet sections 24 and 26. Still further, monitor 20, in some embodiments, may include only a single pivotable section. In still other embodiments, monitor 20 may be configured without first and second motors 34 and 36, but may include a wheel or other suitable structures for allowing manual rotation of first and second sections 24 and 26 about first and second axes 42 and 48.

Each of motors 34 and 36 are connected by suitable communication cables 54 and 56, respectively, to a control box 58. Control box 58 encloses a controller 60 (FIG. 6) that, as will be discussed in greater detail below, controls the operation and movement of motors 34 and 36. Controller 60 communicates with motors 34 and 36 over cables 54 and 56, sending commands to motors 34 and 36 to rotate in a particular direction. Motors 34 and 36, also may communicate with controller 60, transmitting data over cables 54 and 56 indicating the current position to which inlet and outlet sections 24 and 26 have been rotated by motors 34 and 36. Alternatively, a pair of rotation sensors 35 and 37 (FIG. 6) may communicate the current orientation of inlet and outlet sections 24 and 26 to controller 60. Such rotation sensors 35 and 37 may be separate from motors 34 and 36, or they may be integrated within motors 34 and 36.

Figure 6:
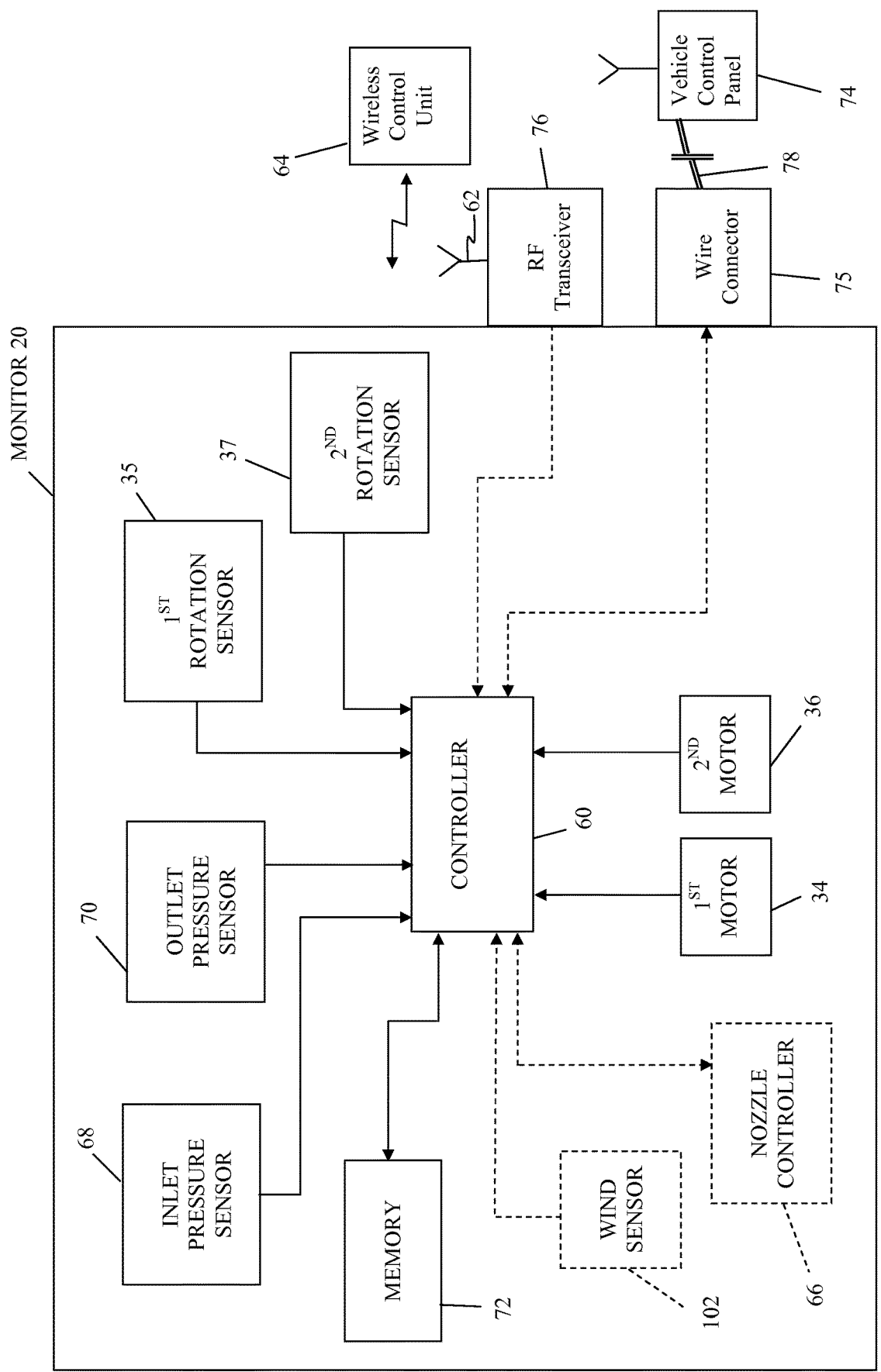
FIG. 6 is a block diagram of several control components of the monitor.

Control box 58 includes an antenna 62 that may both receive and transmit data wirelessly to and from controller 60. Data received by antenna 62 and passed to controller 60 includes motor control commands transmitted by one or more wireless control units 64 (FIG. 6). The motor control commands indicate to controller 60 the manner in which it should rotate inlet and outlet sections 24 and 26 of monitor 20. Wireless control unit 64 thereby allows a firefighter to remotely control the orientation of monitor 20, enabling the firefighter to aim the stream of firefighting fluid via control unit 64 from a location removed from the vicinity of monitor 20. While other types of wireless communication are possible, radio frequency (RF) communications between control box 58 and control unit 64 may be used. Such radio frequency communications may enable remote control of controller 60 from locations a quarter mile or more away.

Control box 58 is also in communication with a nozzle controller 66 (FIGS. 1 and 2). Nozzle controller 66 includes a motor that selectively changes the position of an internal component, such as a stem (not shown), that alters the shape of the beam or spray of fluid exiting nozzle 28. Nozzle controller 66 receives commands from control box 58 dictating the setting to which nozzle 28 should be set. Nozzle controller 66 further sends data to control box 58 indicating the current state of nozzle 28. From this information, controller 60 is able to determine whether the firefighting fluid is exiting nozzle 28 as a spray or a stream, as well as the degree to which the spray pattern is being dispersed. Nozzle controller 66 and controller 60 communicate via any suitable wire or wireless connection therebetween. Nozzle controller 66 may also forward data to controller 60 indicating the orifice size of nozzle 28. Alternatively, such orifice size information may be manually input into control box 58 by a user through any suitable user interface, such as buttons, knobs, switches, etc. As will be discussed in greater detail below, controller 60 may use this orifice size, in conjunction with other information, to determine a reaction force from the firefighting fluid flowing through nozzle 28, and/or a reach of the fluid.

As illustrated in FIG. 3, firefighting monitor 20 includes a first pressure sensor 68 positioned generally near the junction of base 22 and inlet section 24, and a second pressure sensor 70 positioned generally near the junction of outlet section 26 and nozzle 28. The positions of both first and second pressure sensors 68 and 70 can be varied substantially from that indicated in FIG. 3. First and second pressure sensors 68 and 70 measure the pressure of the firefighting fluid that flows through passageway 32. The pressure measurements of sensors 68 and 70 reflect the pressure of the fluid adjacent the location of each of the sensors 68 and 70. When firefighting fluid flows through passageway 32 from inlet section 24 to outlet section 26 and out nozzle 28, the fluid pressure sensed by first sensor 68 will be greater than the fluid pressure sensed by second sensor 70 according to well-known principles of fluid dynamics.

Each pressure sensor 68 and 70 repeatedly measures the pressure inside passageway 32 and forwards the measurement results to controller 60 inside control box 58. The frequency at which such measurements are made can be varied. In at least some embodiments, the pressure measurements are made multiple times per second. One or more wires, cables, or wireless transmitting and receiving means (not shown) may be used to forward the pressure measurements of sensors 68 and 70 to control box 58.

Controller 60 uses the pressure measurements from sensors 68 and 70 to determine the rate of flow of the firefighting fluid in passageway 32. Controller 60 determines the flow rate by calculating the difference between the pressure measurements of sensors 68 and 70 to yield the delta pressure. The delta pressure information is then used in conjunction with Bernoulli's fluid flow equation, along with a friction loss algorithm, to determine the flow rate of the firefighting fluid. The friction loss algorithm takes into account the known frictional characteristics of a particular monitor. Such known frictional characteristics may be stored within an electronic memory 72 housed within control box 58, which may be a flash memory, RAM, ROM, EEPROM, or any other suitable type of memory that may be read by controller 60. The known frictional characteristics may also take into account, to the extent it is significant, the current rotational orientations of inlet and outlet sections 24 and 26. The mathematics involved in accounting for the frictional losses of the monitor 20 on the fluid are known to those of ordinary skill in the art, and need not be repeated herein.

The use of two pressure sensors 68 and 70 to calculate a delta pressure and the use of the calculated delta pressure information to determine a flow rate of the firefighting fluid allows for a more accurate determination of the flow rate of the fluid than prior art flow rate sensors. In the past, paddle wheel type flow rate sensors have been used, and such paddle wheel sensors generally have not provided as much accuracy in their readings as is afforded by the combination of sensors 68 and 70.

After determining the flow rate of fluid through monitor 20, controller 60 may display this information on a display screen mounted to control box 58 (not shown), or it may display the flow rate information in other ways. In one embodiment, controller 60 transmits the flow rate information to a remote location, such as to a vehicle control panel 74, to wireless control unit 64, to both of these, or to still other structures (FIG. 6). The transmission may be wirelessly transmitted, such as through RF transmitter 76, or it may be a transmission forwarded to a wire connector 75, which passes the transmission on through a wire connection 78. Wire connection 78 may comprise one or more cables or wires, and may include the appropriate wiring for a network connection, such as a Controller Area Network (CAN) or other type of network. The vehicle control panel 74 may be mounted to a mobile firefighting vehicle 80 (FIG. 7) and may include one or more suitable displays for visually enabling fire personnel to see or access the flow rate data.

Controller 60 also receives, as noted above, information from motors 34 and 36 that allows controller 60 to determine the current angular orientation of inlet section 24 and outlet section 26. Such information may include an indication of the current position of each motor 36 and 38, which may allow controller 60, in combination with predetermined dimensional data for worm gear assemblies 38 and 44, to compute the current orientation of inlet section 24 and outlet section 26. Alternatively, such information may include a direct indication of the current orientation of sections 24 and 26. Still further, such information may include an indication of the total amount of rotation of either motors 34 and 36, or sections 24 and 26, from which controller 60 is able to determine the current rotational orientation of sections 24 and 26 by combining this information with a known starting position of either motors 34 and 36, sections 24 and 26, or a combination of the two.

From the knowledge of the current orientations of sections 24 and 26, along with the flow rate of fluid through monitor 20 and the size of the exit orifice of nozzle 28, controller 60 is able to calculate the amount and direction of the reaction force caused by the flow of the fluid through passageway 32. As was noted above, the orifice size of nozzle 28 may be input manually into control box 58, and thus into controller 60, or it may be electronically transmitted to controller 60 from nozzle controller 66. Controller 60 may also utilize information about the position of the nozzle stem in calculating the reaction force, to the extent a significant effect results.

The manner in which controller 60 may calculate the reaction force caused by the flow of fluid through monitor 60 may take on any known means. Such calculations may be based upon information stored in memory 72 relating to the specific configuration of monitor 20 and the manner in which this specific configuration reacts to water flow. Or such calculations may be based upon empirical data stored in memory 72 derived from prior testing of the monitor. Or, in still other embodiments, the calculations may not involve any calculation at all, but rather may involve consulting a table stored in memory 72 that matches reaction forces together with the current values of the flow rate, nozzle size, and orientation of sections 24 and 26. A mixture of any one or more of the techniques may also be used, as well as other methods for determining the reactions forces.

The reaction force calculated by controller 60 indicates the current amount of force that the flowing fluid is exerting on monitor 20. Controller 60 also calculates this force in at least one direction. In some embodiments, controller 60 may calculate this force in multiple directions, up to three. The calculation of the reaction force may therefore result in a one dimensional, two-dimensional, or three-dimensional vector. The calculation of the reaction force is performed repeatedly, such as, but not limited to, multiple times a second in order to provide updated reaction force information that dynamically adjusts to the potentially changing conditions of flow rate and/or monitor orientation.

Figure 7:
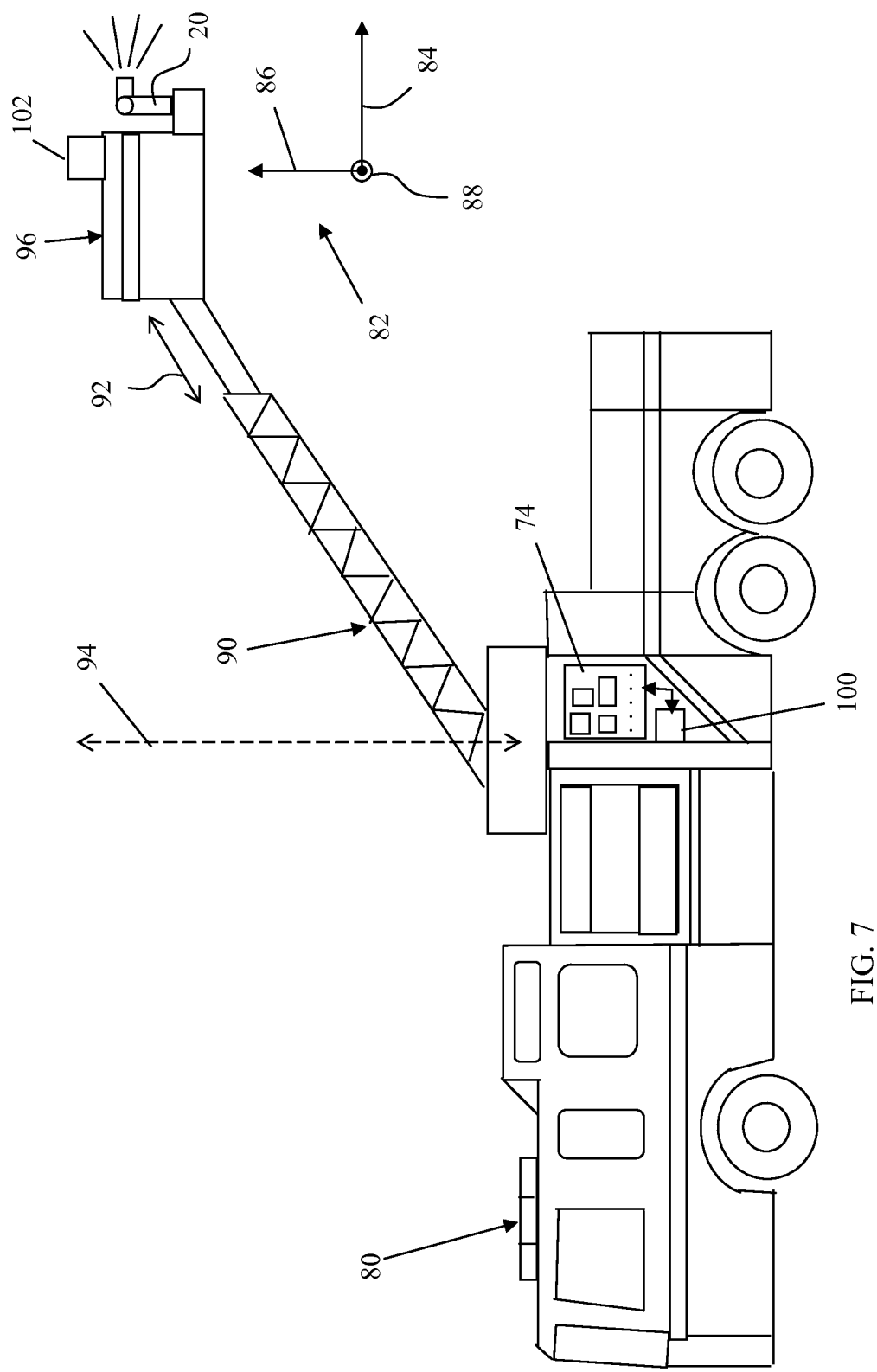
FIG. 7 is an elevational diagram of an illustrative firefighting vehicle to which the monitor may be attached.

FIG. 7 provides an illustration of the reaction force that may be calculated by controller 60. For purposes of ease of description, an arbitrary frame of reference 82 is indicated in FIG. 7 that includes an x-axis 84, a y-axis 86, and a z-axis 88. The x-axis 84 is generally horizontally aligned and parallel to the longitudinal extent of firefighting vehicle 80. The y-axis is also generally horizontal and perpendicularly oriented with respect to both the x-axis and the longitudinal extent of vehicle 80. In FIG. 7, the y-axis extends into and out of the page. The z-axis extends vertically and is perpendicular to both the y-axis and the x-axis. Controller 60 may calculate the amount of force exerted by the firefighting fluid along one or more of the axes of frame of reference 82. Alternatively, controller 60 may calculate the reaction force using another frame of reference with a different angular alignment, or it may simply calculate an amount of force in a single direction, such as, but not limited to, the vertical direction.

Regardless of the particular form of the reaction force calculation, controller 60 is adapted to transmit the calculated force to an off-board entity, such as the vehicle control panel 74, or the wireless control unit 64, or both, or still to some other entity which desirably should receive this information. As noted above, the transmission of this data may take place via RF transceiver 76, via wire connection 78, via both, or via other means. The receiver of the data may utilize the data in any of multiple ways, including passing it on to other entities, such as a control structure.

According to one embodiment, vehicle control panel 74 is configured such that, when it receives the reaction force data from controller 60, it uses the data to control one or more aspects of the structure to which the monitor 20 is attached, such as by passing the data to an on-board controller 100, or through other means. For example, in the illustration of FIG. 7, vehicle control panel 74 is configured such that it uses the reaction force data it receives from controller 60 to control one or more aspects of firefighting vehicle 80. The particular aspects that are controlled may be varied. In general, control panel 74, or other suitable circuitry and/or control logic (e.g. controller 100) in communication with control panel 74, will compare the reaction force data received from controller 62 to one or more criteria or thresholds to determine if the reaction force has exceeded the criteria or thresholds. The criteria is generally safety related criteria specific to the particular structure to which monitor 70 is attached. Such criteria may define, for example, situations where the reaction force could create the possibility of tipping vehicle 80, damaging the boom 90 on vehicle 80, or other undesirable situations.

In the example illustrated in FIG. 7, the criteria to which the reaction force data from controller 60 is compared is criteria relating to the safe positioning of a boom 90. As shown in FIG. 7, boom 90 is extendable and retractable along its longitudinal axis in the direction indicated by arrow 92. Boom 90 is also rotatable about a vertical axis 94, thereby allowing a platform 96 to be swung from a position behind vehicle 80 to a position in front of vehicle 80, as well as positions therebetween along the sides of vehicle 80. Because of the different rotational positions of boom 90, as well as the differing amounts of extension and retraction of boom 90 in the direction of arrow 92, different amounts and orientations of force will be exerted by boom 90 onto vehicle 80. These different amounts of force will be effected by the reaction force of the fluid flowing through monitor 20. That is, the amount of strain boom 90 will exert on vehicle 80 will vary depending upon the amount of fluid flowing through monitor 20 and the direction the fluid is being discharged.

In the past, manufacturers of firefighting vehicles, such as vehicle 80, have often limited the range of motion of boom 90 in which firefighting fluid may be expelled from a monitor positioned atop the boom because of the possibility that the reaction force of the fluid through the monitor may create an unsafe situation, such as tipping of the vehicle, or an amount of force that is otherwise undesirable. Such unsafe or undesirable situations typically depend upon the amount of extension of boom 90, as well as the particular angular rotation of boom 90 about vertical axis 94. Given a particular orientation and extension of boom 90, the manufacturer of a prior art firefighting vehicle would often configure control panel 74, or other internal control components on vehicle 80, such that fluid could not be delivered to a monitor positioned atop boom 90. Thus, prior art firefighting vehicles have often included certain blackout orientations and positions in which the boom, or other structure to which the monitor is mounted, is not permitted to allow for the discharge of firefighting fluid.

According to at least some embodiments, the present improved monitor 20 enables such blackout conditions to be either reduced or eliminated. By calculating the current amount of reaction force generated by the flowing firefighting fluid and transmitting it to a suitable receiver on board vehicle 80, such as, but not limited to control panel 74, a controller 100 on board vehicle 74 is able to take a more varied response in boom situations that might have previously resulted in a blackout condition (FIG. 7). If the current reaction force of monitor 20 and the current configuration of boom 90 meet one or more predetermined conditions or criteria, controller 100 may do one or more of the following: (1) it may automatically reduce the flow of fluid being delivered to monitor 20 until the predetermined conditions or criteria are no longer met; (2) it may automatically move boom 90, or any other structure to which monitor 20 is attached, until the conditions are no longer met; (3) it may send a signal to controller 60 instructing it to rotate one or both of first sections 24 and/or 26 in a manner that will remedy the conditions; (4) it may issue a warning to the user or users of monitor 20 that the conditions have been met; and/or (5) it may take other appropriate measures too.

When responding to the calculated reaction force by automatically reducing the flow of fluid, controller 100 communicates with whatever other controllers, actuators, and/or other sensors that are necessary for it to carry out the reduction in the fluid flow. By automatically reducing the fluid flow, the reaction force in monitor 20 will likewise diminish. Once a suitable reduction in the reaction force has been achieved, controller 100 will allow fluid to flow through monitor 20 at the acceptable rate. This enables firefighting vehicle 80 to still deliver fluid at a particular boom configuration, but automatically controls the fluid flow such that unsafe, or otherwise undesirable, conditions are not encountered. The complete blackout conditions of the prior art are therefore either eliminated or reduced, thereby improving the utility of the firefighting vehicle 80.

As noted above, controller 100 aboard vehicle 80 may alternatively react to high reaction forces by automatically moving boom 90 to a configuration in which the current reaction forces within monitor 20 no longer meet the predetermined criteria. As but one example, boom 80 may automatically retract when excessive reaction forces are encountered, thereby reducing the moment arm of boom 90, and, as a result, reducing the amount of torque that the reaction force of monitor 20 may be exerting on the supporting structure for boom 90 and/or vehicle 80. Situations where the reaction forces may encroach undesirably close to a tipping danger of vehicle 80 may therefore be avoided. In addition to automatic extension aid/or reaction of boom 90, controller 100 may also be programmed, or otherwise configured, to make rotational movements of boom 90 about axis 94 in order to alleviate situations where the reaction forces inside monitor 20 are greater than desired.

In a similar manner, controller 100 may also react to excessive reaction forces by sending appropriate commands to controller 60 inside control box 58 that instruct controller 60 to change the rotational orientation of one or both of inlet and outlet sections 24 and 26. As has been discussed above, controller 60 accomplishes this by activating the appropriate first or second motor 34 and 36 in the appropriate direction and for the appropriate duration. The instructions transmitted by controller 100 may specifically indicate the direction and amount of rotation of each section 24, 26, or the instructions transmitted by controller 100 may simply instruct controller 60 to determine the correct rotational response to the current amount of reaction force—in which case controller 60 will have access to sufficient computational resources to determine the specific rotational requirements. In either case, sections 24 and/or 26 of monitor 20 will be rotated in a manner that adjusts the fluidic reaction forces in such a manner that the magnitude and/or orientation of the reaction forces is sufficiently changed or reduced.

Either in lieu of, or in addition to, any of the foregoing reactions to excessive reaction forces, controller 100 may issue one or more alerts to firefighting personnel. Such alerts may be issued on a display screen mounted on control panel 74, through one or more lights on vehicle 80, through a transmission to control box 58, or through any other suitable means that will provide an indication to the firefighting personnel that the reaction forces in monitor 20 have met one or more criteria which the firefighting personnel should be aware of. Depending upon the specific parameters defined in the criteria, the firefighting personnel may make adjustments to boom 80, the fluid flow to monitor 20, or any other component in the overall firefighting system. In some situations, the alert issued to the firefighting personnel may simply be informational, in which case no specific action is required by the firefighting personnel. In other cases, the firefighting personnel may be expected to take specific measures in response to the alert. Still further, in some embodiments, controller 100 may be configured to wait a certain amount of time after issuing the alert and, if no reaction has been manually undertaken by the firefighting personnel, controller 100 may automatically take one or more appropriate reactions.

The choice and definition of the criteria to which controller 60 will institute one or more of the foregoing reactions can be varied widely. In some embodiments, the criteria may specify that reaction forces in monitor 20 above a certain magnitude and/or direction are unacceptable for particular boom configurations. In other situations, the criteria may define a sufficient margin of safety such that when the criteria is met, there is still sufficient time for the appropriate actions and/or reactions to be undertaken before an unsafe or undesirable condition is encountered. In still other situations, the criteria may specify any type configuration or status information for which it is desirable to initiate a suitable reaction from either controller 60 or controller 100.

As was noted above, the comparison of the reaction force and/or orientation data of monitor 20 with the predetermined criteria may take place within, or under the control of, controller 100, or some other control circuitry positioned on firefighting vehicle 80. In an alternative embodiment, this comparison may be performed by controller 60 of monitor 20. Controller 60 may perform this in any of a variety of different manners. As one example, a data file of the criterion, or criteria, may be uploaded to memory 72 of controller 60 indicating which configurations and/or reaction force levels are to be monitored, and what the numerical constrains are for monitoring these parameters. The particular criterion or criteria that is uploaded may depend upon the type of vehicle to which monitor 20 is mounted, as well as other factors. If controller 60 determines that its current orientation and/or flow rate and nozzle size meet one or more of the uploaded criteria, it may itself take appropriate action, or it may transmit a signal to controller 100—or other controller—on-board the vehicle, or any combination of these actions.

In performing the various functions described above, controller 100 is apprised of the position and mounting orientation of monitor 20 on platform 96. Controller 100 may receive this information during an initial calibration of controller 100, or during an initial calibration of monitor 20. Such information may be entered manually through any suitable user-interface for controller 100 or controller 60. Controller 100 is also programmed to be able to accept the reaction force calculations from controller 60 in the frame of reference utilized by controller 60, such as frame of reference 82. That is, controller 100 is programmed to be able to convert the force measurements defined in frame of reference 82 to force measurements defined in another frame of reference, if desired, or controller 100 may continue to utilize the force measurements in the same frame of reference used by controller 60.

Controller 100 is also configured to be in communication with one or more conventional sensors (not shown) on-board firefighting vehicle 80 that indicate the current orientation of boom 90 about vertical axis 94, as well as one or more sensors indicating the amount of extension/retraction of boom 90 in direction 92. From this information, along with the known mounting position of monitor 20 to boom 90, controller 100 is able to determine the forces being exerted on boom 90 and/or vehicle 80 due to the flow of fluid through monitor 20. Vehicle 80 may also be equipped, in some embodiments, with a weight sensor (not shown) positioned to determine the weight of one or more individuals standing on platform 96. If so equipped, controller 100 may receive this information and use it, along with the fluid reaction force data, to determine if one or more criteria are being met, such as, but not limited to, safety criteria.

In some situations, more than one monitor 20 may be mounted to a particular structure, such as, but not limited to, boom 90. Monitor 20 therefore may include, in at least some embodiments, an input on control box 58 for connecting a wired or wireless transmission medium to the control box 58 of another monitor 20. Such an input is configured to receive the reaction forces calculated by the other monitor. The monitor receiving these reaction forces is programmed to add these reaction forces to its own calculated reaction forces and to output the combined reaction forces to a remote receiver, such as control panel 74, control box 58, or other entity. Thus, if two monitors 20 were mounted to boom 90, for example, the controller 60 of one monitor would sum the reaction forces of both monitors together—taking into account any geometrical differences in their mounting locations—before transmitting the reaction force to control panel 74 and/or controller 100. In such a situation, both monitors 20 could alternatively send their individual reaction force calculations to control panel 74 and/or controller 100, which would then sum the two forces together and take any appropriate action based upon the sum total of their reaction forces.

Controller 60 of monitor 20 may also, in some embodiments, determine a reach of the firefighting fluid. This determination of reach may be in lieu of, or in addition to, the calculation of the reaction force of the firefighting fluid. Controller 60 determines the reach based upon the type of nozzle attached to monitor 20 and the flow rate of the firefighting fluid. In some embodiments, a wind speed and wind direction sensor 102 (FIG. 7) that is positioned within the general vicinity of monitor 20 may feed wind direction and speed information to controller 60. Controller 60 may use this wind speed and wind direction information in determining the reach of the firefighting fluid. Whether or not the wind speed and direction are factored into the reach calculations, controller 60 may output the reach determination in one or more manners. The reach determination may be indicated on an LCD screen on control box 58. Alternatively, the reach determination may be forwarded to either or both of RF transceiver 76 and/or wire connector 75 for further wireless or wired transmission to control unit 64, vehicle control panel 74, controller 100, or any other suitable electronic structure for which the receipt of such reach information would be desirable. A display screen, gauge, or other device positioned on vehicle 80 can then display the reach determination for assisting the firefighting personnel. Such a display may, in some embodiments, display a three-dimensional sweep pattern using the reach data and data indicating the absolute position of the monitor 20.

In the various embodiments discussed above, controllers 60 and 100 may take on a variety of different forms.

Controllers 60 and 100 may include one or more processors, microprocessors, system on chip (SoC) integrated circuits, microcontrollers, discrete logic, and/or other electronic components and devices suitable for carrying out the functions described above, as would be known to one of ordinary skill in the art. One or more such devices may also be combined together in carrying out the functions described herein. If multiple components are used, they may be geographically dispersed or localized. For example, all of controller 60's components may be located inside control box 60, or some of them may be housed therein while some of them are located remotely, such as on-board vehicle 80. In a like manner, all of controller 100's components may be located on-board vehicle 80, or some may be positioned remotely. The logic for carrying out the functions described herein may be implemented via software, firmware, or any other suitable means. Controller 100 and/or control panel 74 may be in communication with the engine governor on-board vehicle 80 and may coordinate with the engine governor in carrying-out one or more of the functions described herein.

While the foregoing embodiments of monitor 20 have been described primarily with respect to a situation in which monitor 20 is mounted to the boom of vehicle 80, it will be understood by those skilled in the art that the control principles described herein are not limited to such situations. Rather, the embodiments described herein may be practiced on portable monitors, as well as monitors connected to fixed structures.

While several forms of the invention have been shown and described, other forms will be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

What is claimed is:

1. A firefighting monitor comprising:
   a body having an inlet for receiving firefighting fluid and an outlet for discharging the firefighting fluid, the body including a tubular section rotatable about an axis through an arc between a first limit and a second limit;
   a rotation sensor for measuring rotational orientation of the tubular section about the axis along the arc; and
   a controller in communication with the rotation sensor,
      the controller programmed to iteratively determine a current rotational orientation, relative to a known starting position of the tubular section along the arc during operation of the firefighting monitor,
      the controller programmed to receive a command to rotate the tubular section in a particular direction toward a desired orientation,
      the controller programmed to iteratively compare the current rotational orientation against a threshold rotational orientation irrespective of the desired orientation, and
      the controller programmed to take a corrective action when the current rotational orientation exceeds the threshold rotational orientation;
   wherein, the threshold rotational orientation varies based on monitor information obtained from a flow rate detector for determining a rate of flow of the firefighting fluid through the body from the inlet to the outlet, the controller in communication with the flow rate detector;
   further wherein, the flow rate detector comprises a first pressure sensor and a second pressure sensor spaced apart from said first pressure sensor, both said first and second pressure sensors positioned inside said body and in fluid communication with the firefighting fluid flowing therein;
   further wherein, said controller calculates the rate of flow based upon outputs from both said first and second pressure sensors and changes the rotational orientation based on the calculated rate of flow.

2. The firefighting monitor of claim 1 further including a transmitter in communication with the controller, the controller adapted to use the transmitter to transmit to a remote receiver the current rotational orientation of the tubular section.

3. The firefighting monitor of claim 1 wherein:
   the body includes a second tubular section rotatable about a second axis through a second arc between a third limit and a fourth limit;
   the firefighting monitor includes a second rotation sensor for measuring rotational orientation of the second tubular section about the second axis along the second arc; and
   the controller is in communication with the second rotation sensor,
      the controller programmed to iteratively determine a second current rotational orientation of the second tubular section along the second arc, relative to a known starting position, during operation of the firefighting monitor,
      the controller programmed to iteratively compare the second current rotational orientation against a second threshold rotational orientation, and
      the controller programmed to take the corrective action when the second current rotational orientation exceeds the second threshold rotational orientation.

4. The firefighting monitor of claim 3 wherein the controller determines the current rotational orientation and the second current rotational orientation in at least two mutually perpendicular directions.

5. The firefighting monitor of claim 1 wherein the controller is housed within an enclosure positioned remotely from the body.

6. The firefighting monitor of claim 5 wherein the corrective action taken by the controller is to move a mobile boom to which the firefighting monitor is coupled.

7. The firefighting monitor of claim 1 wherein the corrective action taken by the controller is to adjust at least one of an orientation of said firefighting monitor and a flow rate of fluid flowing through said firefighting monitor.

8. The firefighting monitor of claim 1 wherein:
   the controller is programmed to receive the monitor information pertaining to a nozzle orifice size and a nozzle position of a nozzle of the firefighting monitor; and
   the controller is programmed to use the firefighting monitor information to determine a reach of the firefighting fluid when exiting from the nozzle.

9. The firefighting monitor of claim 8 wherein:
   the controller is programmed to receive weather information pertaining to a wind speed and a wind direction; and
   the controller is programmed to use the weather information to determine the reach of the firefighting fluid from the nozzle of the firefighting monitor.

10. The firefighting monitor of claim 1 wherein the corrective action taken by the controller is to limit further rotation along the arc beyond the threshold rotational orientation.

11. The firefighting monitor of claim 1 wherein the corrective action taken by the controller is issuing an alert.

12. The firefighting monitor of claim 3 further comprising: a base;
a first motor coupled to the base and to the tubular section, the first motor configured to cause rotation of the tubular section about the axis;
a second motor coupled to the base and the second tubular section, the second motor configured to cause rotation of the second tubular section about the second axis,
the controller programmed to determine the current rotational orientation of the tubular section and the second tubular section based on an indication of a current position of the first and second motors respectively.

13. The firefighting monitor of claim 12 wherein the controller is programmed to control an operation and a movement of the first and second motors.

14. The firefighting monitor of claim 1 wherein:
the controller is programmed to calculate an amount and a direction of a reaction force caused by a flow of the firefighting fluid through a passageway based on the current rotational orientation and the rate of flow of the firefighting fluid; and
the controller is programmed to alter the rotational orientation if the current rotational orientation and the reaction force are not within one or more thresholds.

15. The firefighting monitor of claim 14 further including a memory accessible by the controller, the memory containing data relating to one or more dimensions of the firefighting monitor, wherein the controller is programmed to use the data in determining the reaction force.

16. A firefighting monitor comprising:
a body having an inlet for receiving firefighting fluid and an outlet for discharging the firefighting fluid, the body including a tubular section rotatable about an axis through an arc between a first limit and a second limit;
a rotation sensor for measuring rotational orientation of the tubular section about the axis along the arc; and
a controller in communication with the rotation sensor,
the controller programmed to iteratively determine a current rotational orientation, relative to a known starting position, of the tubular section along the arc during operation of the firefighting monitor,
the controller programmed to receive a command to rotate the tubular section in a particular direction toward a desired orientation,
the controller programmed to iteratively compare the current rotational orientation against a threshold rotational orientation irrespective of the desired orientation, and
the controller programmed to take a corrective action when the current rotational orientation exceeds the threshold rotational orientation;
wherein, the threshold rotational orientation varies based on monitor information;
further wherein, the monitor information comprises a flow rate detector for determining a rate of flow of the firefighting fluid through the body from the inlet to the outlet, the controller in communication with the flow rate detector;
further wherein, the controller is programmed to calculate an amount and a direction of a reaction force caused by the flow of the firefighting fluid through a passageway based on the current rotational orientation and the rate of flow of the firefighting fluid and the controller is programmed to alter the rotation orientation if the current rotational orientation and reaction force are not within one or more thresholds.

17. The firefighting monitor of claim 16, further wherein the flow rate detector comprises a first pressure sensor and a second pressure sensor spaced apart from said first pressure sensor, both said first and second pressure sensors positioned inside said body and in fluid communication with the firefighting fluid flowing therein.

18. The firefighting monitor of claim 17, further wherein said controller calculates flow rate based upon outputs from both said first and second pressure sensors and changes the rotational orientation based on the calculated flow rate.

* * * * *